(12) United States Patent
Hyllberg et al.

(10) Patent No.: US 6,290,823 B1
(45) Date of Patent: Sep. 18, 2001

(54) CONVERTIBLE ELECTRODE ROLLER FOR CORONA TREATING SYSTEMS

(75) Inventors: Bruce E. Hyllberg, Gurnee, IL (US); Gary S. Butters, Greenfield, WI (US)

(73) Assignee: American Roller Company, Union Grove, WI (US)

( * ) Notice: Subject to any disclaimer, the term of this patent is extended or adjusted under 35 U.S.C. 154(b) by 0 days.

(21) Appl. No.: 09/553,784

(22) Filed: Apr. 21, 2000

(51) Int. Cl.[7] .............................. C25B 11/00; B01J 19/08
(52) U.S. Cl. .................. 204/280; 204/164; 422/186.13; 422/186.18; 422/186.22
(58) Field of Search .................. 422/186.13, 186.18, 422/186.22; 204/280, 164

(56) References Cited

U.S. PATENT DOCUMENTS 4,946,568 * 8/1990 Kalwar et al. ..................... 204/164
5,169,450   12/1992 Opad et al. ........................ 118/621
5,268,151 * 12/1993 Reed et al. ..................... 422/186.18

* cited by examiner

*Primary Examiner*—Bruce F. Bell
(74) *Attorney, Agent, or Firm*—Quarles & Brady LLP

(57) ABSTRACT

A corona treatment system (10*d*) has a corona treatment generator (11*d*), a first stationary electrode (12*d*) having a dielectric layer (18*d*) disposed thereon and a second roller electrode (13*d*) spaced from the first stationary electrode (12*d*) by a gap (15*d*). The second roller electrode (13*d*) has a layer of dielectric material (19*d*) disposed around a core (23*d*) and has a conductive layer (24*d*) disposed over a substantial portion of a length of the second roller (13*d*). A switch (20) is electrically connected between the conductive layer (24*d*) and an electrical ground, and the switch (20) is operable to switch the system between a grounded web mode and a dual dielectric mode.

15 Claims, 4 Drawing Sheets

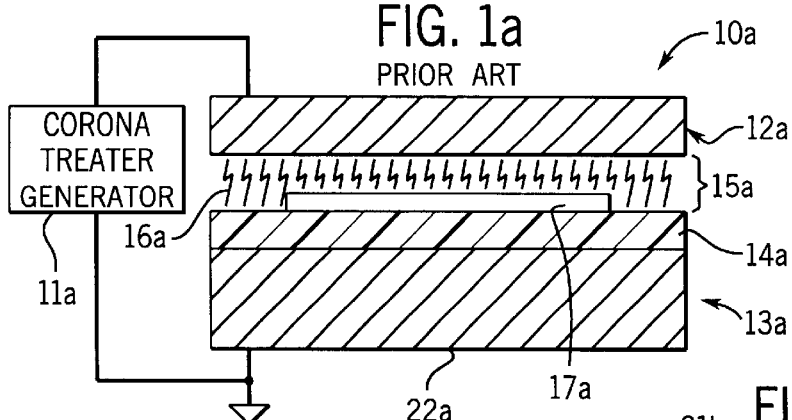
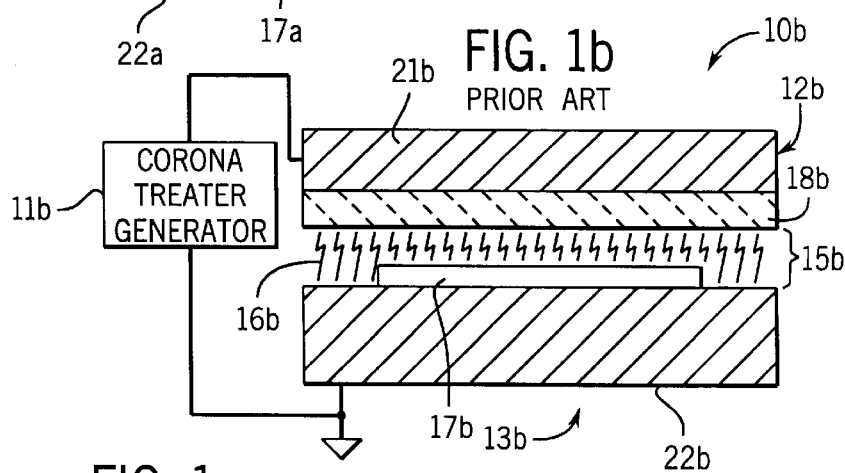
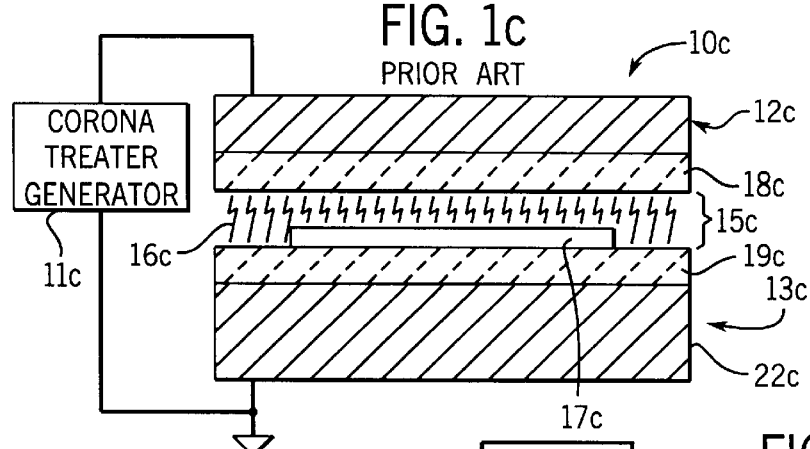
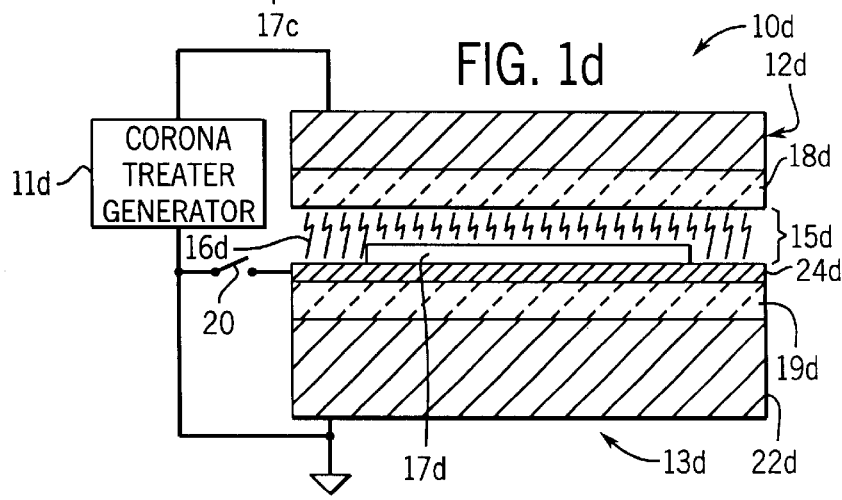

CONVERTIBLE ELECTRODE ROLLER FOR CORONA TREATING SYSTEMS

TECHNICAL FIELD

The invention relates to rollers and electrodes for use in corona treating systems.

BACKGROUND ART

The prior art includes treatment of plastic films, papers, metal foils, and other materials using a high frequency, high voltage, electrical discharge, or corona. Early equipment employed a spark gap to generate the high frequency required. In the late 1960's, solid state generators were introduced which used SCR's (silicon controlled rectifier). The latest equipment uses IGBT's (insulated gate bipolar transistors) to provide high frequency switching within the power supply, also referred to herein as the "corona treatment generator."

Referring to FIG. 1a, a "conventional" corona treatment station 10a of the prior art is composed of a corona treatment generator 11a, providing high frequency and high voltage, a stationary metal electrode 12a, and an electrode roller 13a covered with a thin layer of dielectric material 14a. The electrode 12a and roller 13a are separated by a small gap 15a, usually about sixty mils, where the corona 16a is formed. Although the elements 12a, 13a are formed as cylinders, only their walls next to the corona gap 15a have been shown in section, it being understood that a full section would show a second thickness of layer 14a, for example. The surface energy of a plastic web of material 17a is raised by direct contact with the corona 16a. This improves the wetting and adhesion of inks or coatings applied in subsequent operations.

The electrode 12a in a conventional system is normally bare aluminum, steel, or stainless, in bar, tube, or flat-sided form. The electrode may be shaped (shoe form) to match the curvature of the covered roller. The electrode may also be one piece, for full-width treatment of the web, or broken into sections (segments) to allow adjustment of the area being treated.

Many types of materials have been used for the dielectric covering 14a on the roller in a conventional system. The oldest types are rubber compounds made from silicone and Hypalon™ polymers. Other coverings are made of epoxy and other thermoset resins (solid resin or composites with fibers), glass, and ceramics.

Inorganic coatings, such as glass and ceramic, provide durability and can also provide tolerance to the highest power densities in the corona since they are not combustible. These are more expensive than rubber coverings, for example. Epoxy and ceramic coverings are the most popular dielectrics for conventional systems. The thickness of the polymer coatings is typically 100 to 125 mils, while the thickness of glass and ceramic coatings is much lower, 40 to 80 mils (mainly due to cost). The practical range for all possible dielectric materials is from 20 mils to 500 mils in thickness.

Referring to FIG. 1b, a bare roll form of corona treatment system 10b is shown. In this system 10b, the roller 13b does not have a covering, so the system 10b is referred to as "bare roll". The original dielectric on the upper electrode 12b was quartz but has been replaced with ceramic 18b (aluminum oxide) for improved temperature resistance. The bare roll electrode 12b is usually a tube (or several tubes connected in parallel) of ceramic 18b, filled with metal powder 21b, to avoid the thermal expansion problems of a solid metal electrode. The packed metal powder is connected directly to a high voltage lead from the generator.

The corona 16b of a bare roll electrode system 12b is always full width and cannot be adjusted. The bare roll system 10b has the advantage that the web 17b is in contact with a grounded roller 13b. If a metallic web is being treated, the web 17b will not become energized, due to the grounding. The bare roll system 10b has the disadvantage that it is less efficient than other prior systems. Less input power is delivered from the corona treatment generator 11b to the web 17b. Consequently, the power of a bare roll system 10b must be increased to equal the treatment of other systems, or the line speed must be reduced to reach the desired treatment level.

To overcome or reduce the limitations of the bare roll system, a dielectric cover 19c has been applied to the "bare" electrode roller 13c. The covers 18c, 19c on both the electrode 12c and roller 13c are typically ceramic, although other materials could be used for the roller covering. The added dielectric 19c on the roller 13c shifts the power distribution toward the web 17c, which increases the percentage of the input power actually used to treat the film, however, it does not provide a grounded web.

SUMMARY OF THE INVENTION

The present invention is directed to improvements in corona treatment systems having all of the advantages of prior systems, including favorable power efficiency and grounding of the web, without the limitations of the prior systems. The invention provides a covered electrode roller, and a switching arrangement in which the corona treater system can be switched between a first operating mode as a bare roll system and a second operating mode as a dual dielectric system.

The covering on the convertible electrode roller is preferably made of ceramic such as alumina, zirconia, or a blend of ceramic materials. Other embodiments may employ coverings of other inorganic materials, elastomers including silicone, and thermoset resins and composites, including epoxy and polyester resins.

The convertible electrode roller of the present invention an outer layer over the dielectric layer. This outer layer is conductive. The outer layer can either be grounded (bare roll mode) or ungrounded (dual dielectric mode). This outer layer behaves like a grounded bare metal roller while in the bare roll mode. The bare roll mode can be used for treating conductive or non-conductive webs, papers, films, and foils. While in the dual dielectric mode, the outer layer behaves like a metal foil web wrapped around a dielectric covered roller.

With the outer conductive layer connected to ground, the roller appears to the system to be a grounded metal roller. The capacitance of the roller-web combination is the same as in a bare roll system. The corona also appears the same as it does in a bare roll system with the same characteristics of smoothness or spikiness.

With the outer conductive layer isolated from ground, the system behaves like a dual dielectric treater system, using a ceramic covered electrode, of course. Normally, the corona in a dual dielectric system appears to be smoother than a bare roll or conventional system. In the case of the convertible roller electrode, the corona looks the same in either mode. The corona appears like a corona in a bare roll system.

Other objects and advantages of the invention, besides those discussed above, will be apparent to those of ordinary skill in the art from the description of the preferred embodiments which follow. In the description, reference is made to the accompanying drawings, which form a part hereof, and which illustrate examples of the invention. Such examples, however, are not exhaustive of the various embodiments of the invention, and therefore, reference is made to the claims which follow the description for determining the scope of the invention.

BRIEF DESCRIPTION OF THE DRAWINGS

FIGS. 1a–1c are longitudinal section views of several corona treatment systems of the prior art;

FIG. 1d is a longitudinal section view of a corona treatment system of the present invention;

DETAILED DESCRIPTION OF THE PREFERRED EMBODIMENTS

Figure 2:
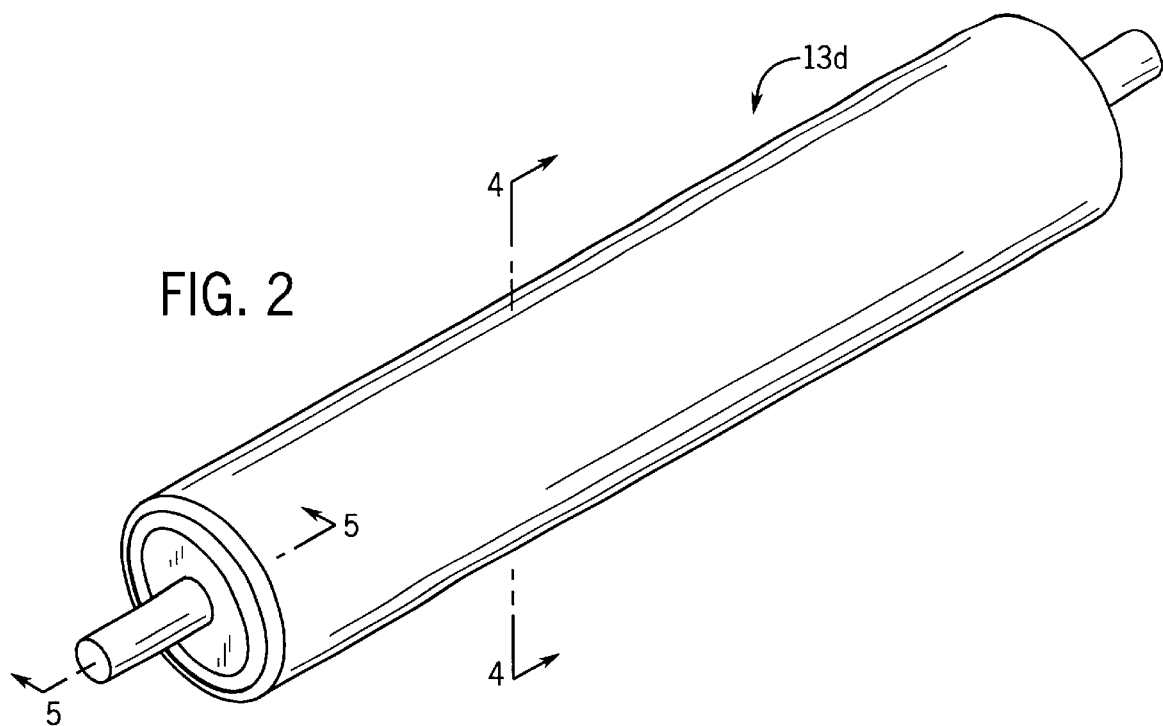
FIG. 2 is a perspective view of an embodiment of the electrode roller for use in the system of FIG. 1d.
Figure 3:
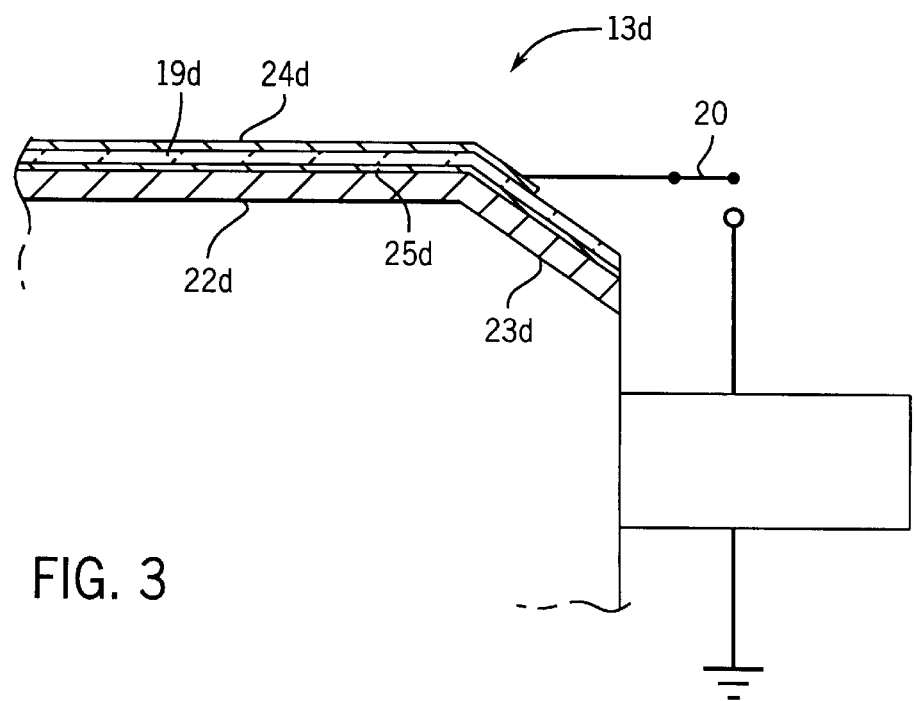
FIG. 3 is a schematic detail view of the system of the present invention.

The invention relates to the system 10d illustrated in FIG. 1d, and more particularly to a corona electrode roller 13d illustrated in FIG. 2. As shown diagrammatically in FIG. 3, the roller 13d includes a core 22d, which may have tapered ends 23d, one of which is seen in FIG. 3. The core 22d is preferably made of steel. A bond coat 25d is applied to the core 22d. A layer of dielectric material 19d as described previously in relation to FIG. 1d is applied over the bond coat 25d and the core 22d, and a conductive layer 24d is applied over the dielectric layer 19d. The conductive layer 24d is terminated about two inches short of the ends of the core 22d. A switch 20, shown schematically, connects the conductive layer 24d to the core 22d and to an electrical ground. By closing switch 20, the outer conductive layer 24d is grounded, and this will ground a web 17d traveling over the conductive layer 24. If the switch 20 is open, the outer conductive layer 24d is floating or ungrounded.

The covered electrode roller 13d of the present invention has a dielectric layer which can be in the range of 20 mils or more. The typical ceramic layer will be in the 20 to 40 mil range, but treating efficiency (in the dual dielectric mode) is improved if the coating is thicker (up to at least 125 mils). The resulting "layer" can be made of thinner layers or coatings applies in multiple passes in thermal spraying.

The dielectric on the convertible electrode roller is preferably made of ceramic such as alumina, zirconia, or a blend of ceramic materials. Other embodiments may employ dielectrics of other inorganic materials, elastomers including silicone, and thermoset resins and composites, including epoxy and polyester resins.

The convertible electrode roller 13d of the present invention provides an outer layer 24d over the dielectric layer 19d. The outer layer is a good conductor. The outer layer 24d can either be grounded (bare roll mode) or ungrounded (dual dielectric mode). This layer behaves like a grounded bare metal roller while in the bare roll mode. The bare roll mode can be used for treating conductive or non-conductive webs, papers, films, and foils.

While in the dual dielectric mode, the outer layer 24d behaves like a metal foil web wrapped around a dielectric covered roller 13d. With this layer, the voltage is confined to the roller 13d and is not transported beyond the treater station by the web 17d. The dual dielectric mode is used for non-conductive webs only; papers and films, not foils. A low resistance is preferred in the outer layer 24d by selection of the material and layer thickness to ensure that it is well grounded while in the bare roll mode. The layer can be a conductive coating, conductive sleeve, conductive paint, or electroless metal plating, wrapped metal sheeting, wrapped wire layer, metal tube, or a thermal sprayed layer of a conductive metal, ceramic, or cermet. The preferred materials are resistant to oxidation and the erosive effects of direct constant exposure to the corona. These include conductive ceramics, cermets, nickel chromium and other alloys which are highly oxidation resistant.

The outer conductive layer 24d is typically thin and can carry a minimum current of one amp while being grounded on at least one end. If the outer conductive layer 24d is grounded at one end only in the bare roll mode of operation, it is sufficiently conductive that the voltage on the opposite end is close to ground potential, while the corona system is in operation. If the outer conductive layer is a thermal-sprayed coating, the layer is at least one mil thick, after any grinding or finishing operation, but is typically five mils or more in thickness. The preferred thermal spray coatings are stainless steels, nickel and nickel alloys, nickel chromium, and cermets containing chromium oxide and titanium dioxide ceramics. Coatings containing ceramics would typically be more than five mils in thickness.

The apparent capacitance of the roller-web combination is higher than expected. This is because the system senses the capacitance of the entire roller, not just the area under the electrode. The corona is in electrical contact with the outer conductive layer 24d in the area of the ceramic electrode. The outer conductive layer 24d is in electrical (capacitive) contact with the entire dielectric layer which forms a capacitor with the core. It is possible for the outer conductive layer 24d of the convertible roller to retain a stored charge after the corona is turned off. The outer conductive layer 24d must therefore be grounded before personnel come in contact with the roller, or attempt to make the ground connection to convert to the bare roll mode.

The consequence of this higher capacitance on the system is that the dielectric layer can be made much thicker than normal, for increased dielectric strength, without causing power factor problems to the system.

The corona treatment generator 11d converts low frequency power to a high frequency and high voltage. The frequency is normally in the range of 3 to 30 kilohertz. The most prevalent frequency used is 9.6 kHz, but the newest equipment using IGBT's is typically greater than 20 kHz. The RMS voltage delivered to the electrode is in the 10 to 15 kilovolt range, but can be somewhat higher or lower. The latest equipment tends to be lower in voltage.

The corona 16 is a hot plasma of ionized and highly energized gases resulting from the breakdown of air in the high voltage field between the electrode 12d and roller 13d. The web 17d is transported through the corona 16d in contact with the covered roller 13d. Various theories are given as to the actual chemistry of corona treating. The result is that corona treating increases the surface energy of the material surface being treated. This in turn promotes the adhesion and wetting of inks, for printing; or coatings, for coating and laminating applications. The degree of increase is directly proportional to the watt-seconds per square inch (time-power function) exposure to the corona, but varies widely with the type of material being treated, initial surface energy, and the type and level of additives, such as slip and antiblocking agents, on the surface of the material.

Figure 4:
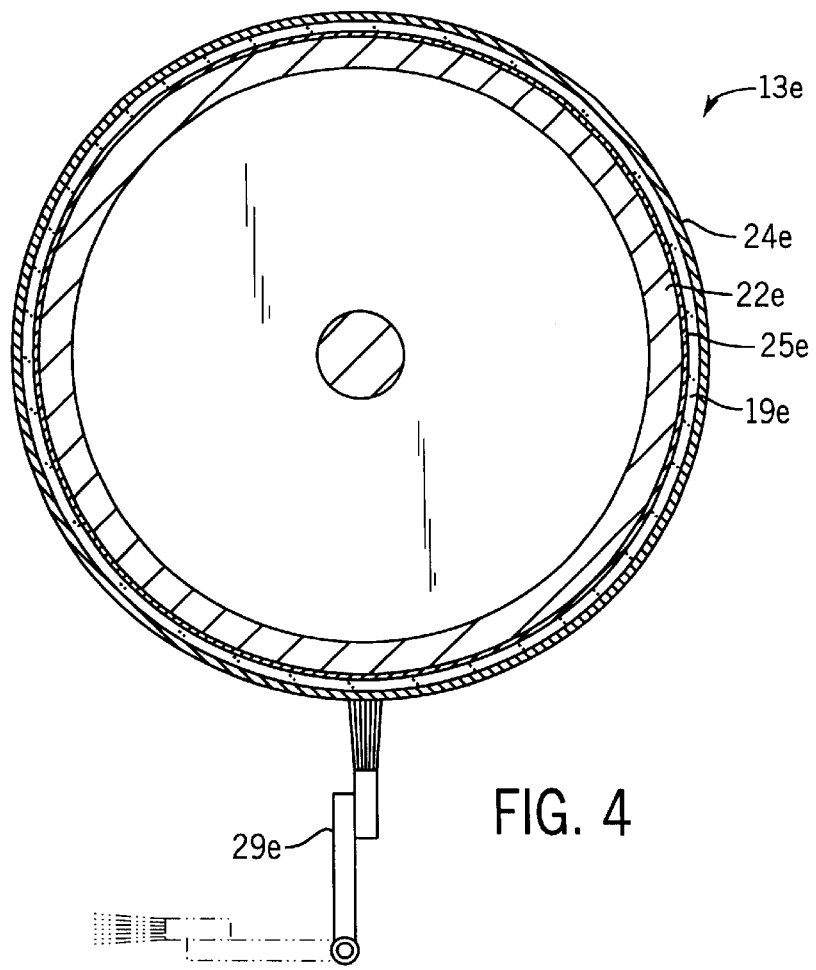
FIG. 4 is a transverse sectional view of the electrode roller of FIG. 2 with a brush contact device.
Figure 5:
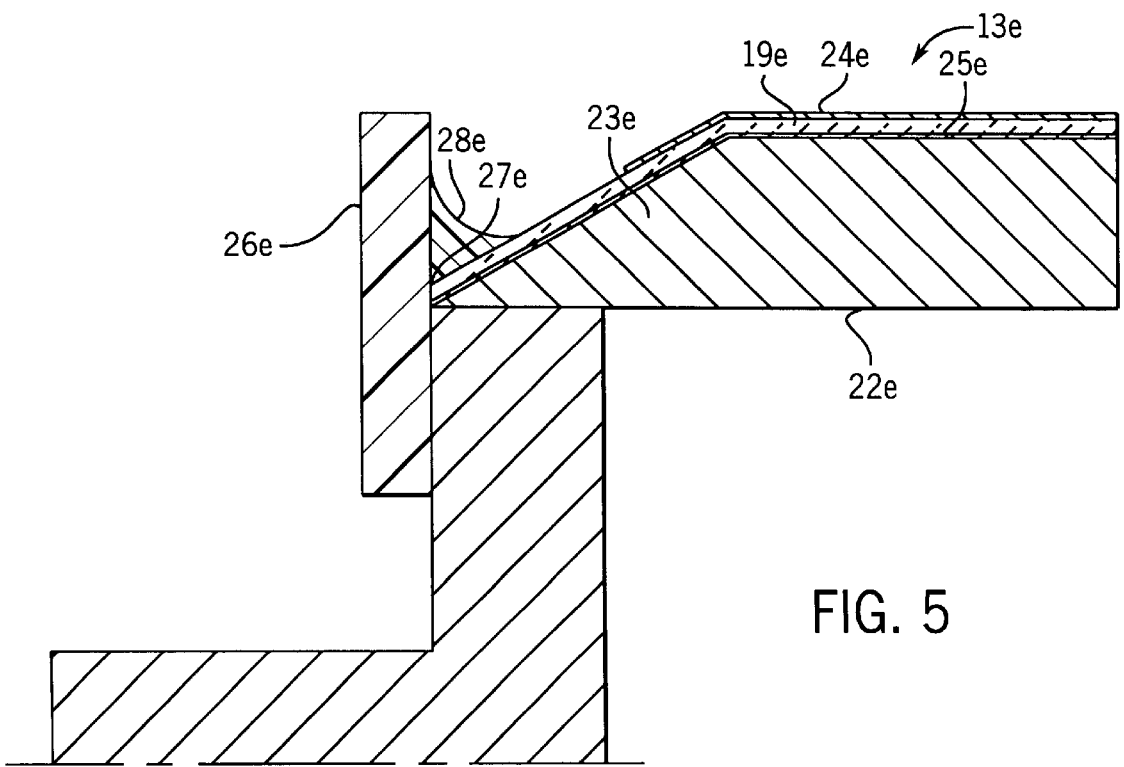
FIG. 5 is a detail sectional view taken in the plane indicated by line 5—5 in FIG. 4.

Referring to FIGS. 4 and 5, in a first example of the invention a roller 11d was constructed as follows. The core 22e was provided by a 3.5×12 steel tube core with 0.375 wall thickness, which was grit blasted. A bond coat 25e was then provided by plasma-spraying a 3–5 mil layer of Sulzer Metco 480 plasma sprayed bond coating. A ceramic layer 19e was then provided by plasma-spraying a 22-mil layer of Norton 110 gray alumina plasma sprayed ceramic. An outer conductive layer was then applied by spraying 2-mil layer of Sulzer Metco 480 as the conductive layer. The layer 24e was terminated two inches short of each end to prevent arcing to the core during the corona testing. The ends 23e of the roller 13e were tapered. The roller 13e was sealed and cured with an organic sealer to fill the pores in the plasma sprayed ceramic coating. After curing, the roller surface was lapped to remove excess sealer.

Insulating disks 26e (FIG. 5) are attached to opposite ends of the roller 13e. Each disk 26e forms a V-shaped groove 27e with the ends of the roller 13. A bead of silicone caulk or other insulating sealant 28e is placed in the groove 27e.

In the preferred embodiment, electrical contact is made with the outer conductive layer 24e by a brush 29e. The brush 29e can be pivoted away from the contact position when it is desired to switch the connection of the conductive layer to ground. Other contact arrangements for the roller, including those using end rings and brushes on the ends of the roller can also be employed.

The convertible roller electrode 13e of the test embodiment was exposed to a corona using a 5 kW Pillar P1000 Corona Generator tuned to suitable settings. The roller was rotating in all cases. A ceramic covered electrode, eight inches long, was used for the testing.

The first test was with a corona gap of about 0.25 inch. For test purposes, the outer metal layer 24e on the test roller was connected to the grounded core 22e with a wire, in place of the brush 28e, to simulate a bare roll treater. The electrode was offset so that part of the corona was outside the metal layer on the bare N110 ceramic. The corona over the metal was more spiky than over the ceramic. A maximum power of about 0.20 kW was achieved.

The gap was reduced to about one sixteenth inch. The corona spikes were smaller and more numerous. The power was the same.

The wire to the core was disconnected to simulate a dual treater system. At a one sixteenth inch gap, the corona looked the same as described above. A maximum power of about 0.22 kW was achieved.

A ceramic covered corona treater roller with a conventional 60-mil thick layer of Norton 110 gray alumina was tested to compare the appearance of the corona with the convertible roller. Even though the ceramic was almost three times as thick, the maximum power achieved was about 0.20 kW. The appearance of the corona was softer and less spiky than the convertible roller.

A bare metal core was substituted for the ceramic covered roller. The appearance of the corona was the same as the convertible roller and the power was again about 0.20 kW.

This testing confirmed that the operation of a dual mode convertible electrode roller. The corona formed the same on the outer metal layer of the convertible roller whether it was grounded to the core or floating, disconnected from ground.

Figure 6:
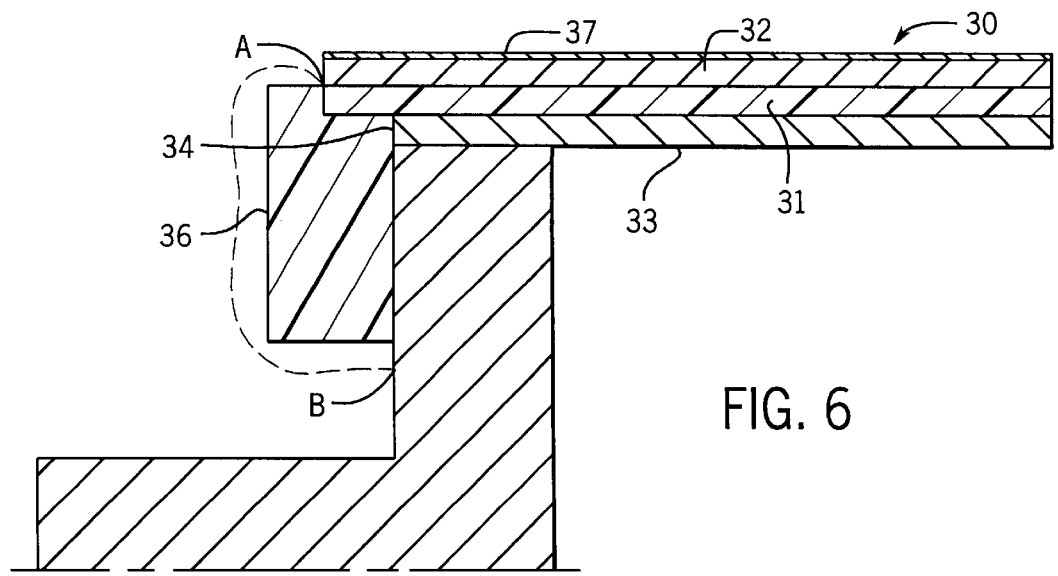
FIG. 6 is a detail sectional view of a second embodiment of the invention taken in the same plane as FIG. 5.

As shown in FIG. 6, another embodiment of the convertible roller electrode 30 preferably utilizes a rubber or composite material for the dielectric layer 31. The roller has inner and outer shells 32, 33 which are spaced about 125 mils apart. Epoxy or room-temperature-cure silicone rubber 31 is cast into the cavity (probably under vacuum to eliminate air bubbles in beyond the end 34 of the inner roller core shell 33. The insulator disk 36 is attached with silicone caulk to prevent arcing from point A to point B. A switch 20, as seen in FIG. 1d, is utilized in a circuit between point A and point B to switch the roller between the grounded mode and the dual dielectric mode. An outer metal sleeve 37 has an oxidation resistant layer of material to prevent oxidation of the core material (probably light weight aluminum).

Figure 7:
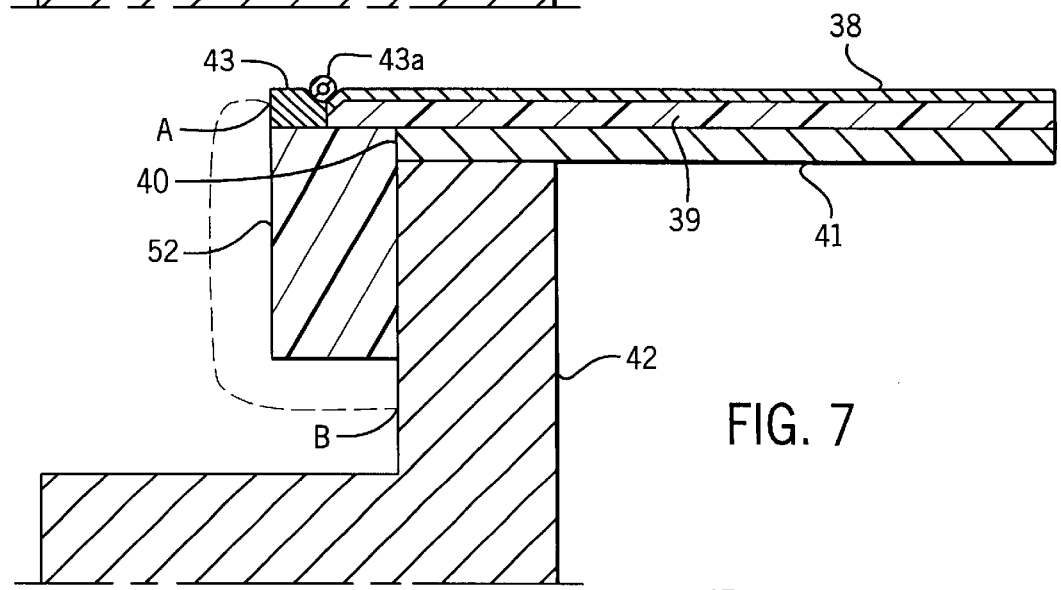
FIG. 7 is a detail sectional view of a third embodiment of the invention taken in the same plane as FIG. 5.

In the embodiment in FIG. 7, an outer metal sleeve 37 has been replaced with a 20-mil thick layer 38 of thermally sprayed metal or cermet. Using temporary forms, a composite material is wound past the end 40 of the core 41, 42 to provide a simplified end cap 52 with superior dielectric strength and arc resistance. Electrical contact is made to the conductive layer 38 by spring 43a and electrode 43. The electrode ring 43 can be connected to an electrical ground by a wire, crimped connectors on each end and a couple of wing nuts, connecting point A to B. A switch 20, as seen in FIG. 1d, is utilized in a circuit between point A and point B to switch the roller between the grounded mode and the dual dielectric mode. This embodiment is very low cost, lightweight, and easy to fabricate.

Figure 8:
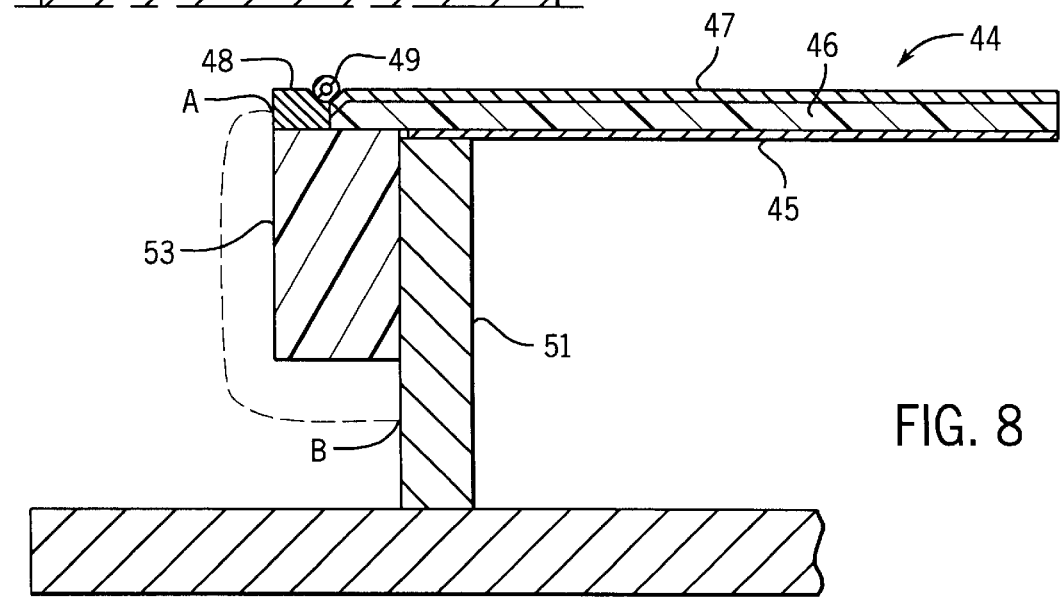
FIG. 8 is a detail sectional view of a fourth embodiment of the invention taken in the same plane as FIG. 5

In the embodiment in FIG. 8, a composite tube 44 is used as a dielectric roller. Electrical contact on each end is made by electrode 48 and spring 49 which is situated in a groove formed between the electrode 48 and a tapered end of the roller 44. The tube 44 has a conductive layer 45 on the inside surface to provide the grounded electrical function of the core 45, 51. The tube 44 also has a composite dielectric layer 46 and an outer conductive layer 47. An end cap 53 similar to the end cap 52 in FIG. 7 is used for the embodiment of FIG. 8. The dual mode of operation can be controlled by an electrical connection between point A and point B shown in FIG. 8. A switch 20, as seen in FIG. 1d, is utilized in a circuit between point A and point B to switch the roller between the grounded mode and the dual dielectric mode. This embodiment has the advantage of low cost, easy replacement, no need for spare cores, and reduced shipping charges (only the tubes, not the cores, need be shipped as replacements).

The dielectric constant and thickness of the covering affects the capacitive reactance of the roller-electrode combination and thus the efficiency of the corona treatment station. Usually the generator circuitry allows or provides adjustment of the power factor for various roller coverings. This is accomplished by adjustments to the output inductor (step-up transformer) or the frequency of the system. Silicone has a low dielectric constant in the range of 3.0–4.0. Ceramic is in the high range, about 9. Most other materials are in the midrange, 5.0 to 6.0. The biggest variation in roller capacitance is between a thick silicone cover and a thin ceramic cover. The capacitance of the roller is an important variable in the treatment efficiency of dual dielectric treater systems.

The above has been a description of the detailed, preferred embodiments of the apparatus of the present invention. Various modifications to the details which are described above, which will be apparent to those of ordinary skill in the art, are included within the scope of the invention, as will become apparent from the following claims.

What is claimed is:

1. An improvement for a corona treatment system having a corona treatment generator, a first stationary electrode having a dielectric layer disposed thereon and a second roller electrode spaced from the first stationary electrode by a gap, wherein the improvement comprises:

the second electrode is a roller having a layer of dielectric material disposed around a core and having a conductive layer disposed over a substantial portion of a length of the second electrode; and a switch that is electrically connected between the conductive layer and an electrical ground, said switch being operable between a first position in which the conductive layer is electrically connected to ground, and a second position in which the conductive layer is not electrically connected to ground.

2. The improvement of claim 1, wherein the dielectric material is a plasma-sprayed layer of ceramic material.

3. The improvement of claim 1, wherein the dielectric material is a composite material.

4. The improvement of claim 1, wherein the dielectric material includes an epoxy material.

5. The improvement of claim 1, wherein the dielectric material includes a silicone material.

6. The improvement of claim 1, wherein the dielectric material is a layer in a thickness range from about 20 mils to 500 mils.

7. The improvement of claim 1, wherein the second electrode roller includes a tube having inner and outer conductive layers and a dielectric material disposed between the inner and outer layers.

8. The improvement of claim 7, wherein the dielectric material includes an epoxy material.

9. The improvement of claim 7, wherein the dielectric material includes a silicone rubber material.

10. The improvement of claim 1, wherein the switch comprises a pivotable brush which contacts the conductive layer of the roller, said brush being electrically connected to an electrical ground.

11. The improvement of claim 1, wherein ends of rollers are insulated by rings of insulating material.

12. The improvement of claim 11, wherein the ends of rollers are tapered to form V-shaped grooves lying adjacent the rings of insulating material; and wherein a body of insulating material is disposed in each of said V-shaped grooves.

13. The improvement of claim 1, wherein the ends of the conductive layer and the dielectric layer are tapered; and further comprising end ring electrodes disposed on opposite ends adjacent the tapered ends of the conductive layer and the dielectric layer; and further comprising coiled springs disposed in the groove to make bridging contact between the ring electrodes and the tapered ends of the conductive layer.

14. The improvement of claim 1, further comprising a bond coat applied between the core and the layer of dielectric material.

15. The improvement of claim 1, wherein the roller is formed of a tube having an outer conductive layer, an inside conductive layer and the dielectric material disposed between the outer conductive layer and the inner conductive layer.

* * * * *